(12) United States Patent
Keetle-Maloney et al.

(10) Patent No.: US 12,548,271 B2
(45) Date of Patent: Feb. 10, 2026

(54) ATTENTION CONTROL IN MULTI-USER ENVIRONMENTS

(71) Applicant: Apple Inc., Cupertino, CA (US)

(72) Inventors: Divine Keetle-Maloney, Santa Clara, CA (US); Steven A. Marchette, Saratoga, CA (US); David Hobbins, Venice, CA (US)

(73) Assignee: Apple Inc., Cupertino, CA (US)

( * ) Notice: Subject to any disclaimer, the term of this patent is extended or adjusted under 35 U.S.C. 154(b) by 158 days.

(21) Appl. No.: 18/532,814

(22) Filed: Dec. 7, 2023

(65) Prior Publication Data

US 2024/0212291 A1 Jun. 27, 2024

Related U.S. Application Data

(60) Provisional application No. 63/434,663, filed on Dec. 22, 2022.

(51) Int. Cl.
| | |
|---|---|
| *G06T 7/50* | (2017.01) |
| *G06F 3/01* | (2006.01) |
| *G06T 5/70* | (2024.01) |
| *G06T 19/00* | (2011.01) |
| *G06V 20/20* | (2022.01) |

(52) U.S. Cl.
CPC ............ *G06T 19/006* (2013.01); *G06F 3/012* (2013.01); *G06F 3/013* (2013.01); *G06T 5/70* (2024.01); *G06T 7/50* (2017.01); *G06V 20/20* (2022.01); *G06T 2207/10028* (2013.01); *G06T 2210/62* (2013.01); *G06T 2219/024* (2013.01)

(58) Field of Classification Search
CPC .......... G06T 19/006; G06T 5/70; G06T 7/50; G06T 2207/10028; G06T 2210/62; G06T 2219/024; G06F 3/012; G06F 3/013; G06F 3/011; G06V 20/20
See application file for complete search history.

(56) References Cited

U.S. PATENT DOCUMENTS

| | | | |
|---|---|---|---|
| 9,213,405 | B2 | 12/2015 | Perez |
| 9,294,873 | B1 | 3/2016 | Macgregor |
| 9,323,325 | B2 | 4/2016 | Perez |
| 9,514,573 | B2 | 12/2016 | Grimaud |
| 10,024,667 | B2 | 7/2018 | Moore |

(Continued)

OTHER PUBLICATIONS

Microsoft Teams: "Change your background for a Teams meeting"; Oct. 17, 2022; pp. 1-2.

(Continued)

*Primary Examiner* — Jitesh Patel

(74) *Attorney, Agent, or Firm* — Thompson Hine LLP

(57) ABSTRACT

Various implementations disclosed herein include devices, systems, and methods that provide a view of an environment with a visual effect based on a determined objective. For example, an example process may include presenting a view of an environment including one or more objects during a communication session involving a second device. The process may further include determining, during the communication session, an objective of a second user of the second device corresponding to identifying a featured object in the environment. The process may further include, in accordance with the determined objective, providing a view of the environment with a visual effect.

24 Claims, 10 Drawing Sheets

(56) References Cited

U.S. PATENT DOCUMENTS

| | | |
|---|---|---|
| 10,275,087 B1 | 4/2019 | Smith |
| 10,642,991 B2 | 5/2020 | Clement et al. |
| 10,803,665 B1 | 10/2020 | Patel |
| 11,200,742 B1 * | 12/2021 | Post .................. G06T 19/003 |
| 12,374,440 B1 | 7/2025 | Arazi |
| 2014/0002444 A1 | 1/2014 | Bennett |
| 2017/0337742 A1 | 11/2017 | Powderly et al. |
| 2018/0018508 A1 | 1/2018 | Tusch |
| 2018/0158197 A1 | 6/2018 | Dasgupta |
| 2019/0094981 A1 | 3/2019 | Bradski |
| 2020/0043354 A1 * | 2/2020 | Ha .................. G06F 3/0304 |
| 2021/0004589 A1 | 1/2021 | Turkelson |
| 2021/0097286 A1 | 4/2021 | Lehrich |
| 2021/0279475 A1 | 9/2021 | Tusch |
| 2022/0215660 A1 | 7/2022 | Liu |
| 2022/0292821 A1 | 9/2022 | Bai |
| 2023/0026575 A1 | 1/2023 | Faaborg |
| 2023/0095621 A1 | 3/2023 | Pushkar |
| 2023/0386202 A1 | 11/2023 | Suresh |
| 2024/0212343 A1 | 6/2024 | Keetle-Maloney |

OTHER PUBLICATIONS

McDonald, Murph I., Richardson, K., Wilkinson, M., Robertson, S.; Karunakaran, A.; Coleman, Gandy; Byrne, M. and McLaughlin, A.C.; "Diminishing Reality: Potential Benefits and Risks"; Proceedings of the 2021 HFES 65th International Annual Meeting; pp. 164-166.

Frontiers: "Shared Dimished Reality: A New VR Framework for the Study of Embodied Intersubjectivity"; Sep. 28, 2021; Sec. Virtual Reality and Human Behavior; pp. 1-17.

Mori, Shohei, Ikeda, Sei; and Saio, Hideo, "A survey of diminished reality: Techniques for visually concealing, eliminating and seeing through real objects"; IPSJ Transactions on Computer Vision and Applications, pp. 1-14, 2017 2017.

Meerits, Siim; Saito, Hideo; "Real-Time Diminished Reality for Dynamic Scenes; 2015 IEEE International Symposium on Mixed and Augmented Reality Workshops", pp. 53-59, 2015 2015.

* cited by examiner

ATTENTION CONTROL IN MULTI-USER ENVIRONMENTS

CROSS-REFERENCE TO RELATED APPLICATIONS

This application claims the benefit of U.S. Provisional Application Ser. No. 63/434,663 filed Dec. 22, 2022, which is incorporated herein in its entirety.

TECHNICAL FIELD

The present disclosure generally relates to electronic devices that use sensors to scan physical environments to generate three-dimensional (3D) models such as 3D representations.

BACKGROUND

Existing scanning systems and techniques may be improved with respect to assessing and using sensor data obtained during scanning processes to generate 3D representations of objects based on positioning and sensor data obtained from a device. It may be desirable for the representations of objects to be distinguished in order to improve searches for particular objects during a viewing experience of the 3D representations.

SUMMARY

Various implementations disclosed herein include devices, systems, and methods that provide a visual effect to distinguish an object in a view of an environment based on using depth-based data (e.g., 3D data) to determine whether the object is a searched—for object (e.g., a lost set of keys). In an exemplary embodiment, based on determining that a first object is a searched—for object (e.g., misplaced keys), one technique may visually distinguish the first object from other objects in a view of the environment. For example, visually distinguishing an object from other objects may include utilizing diminished reality effects on the other objects such that the first object becomes the focus of a current view. Providing visually distinguishing attributes during a viewing experience of an environment or a 3D representation of an environment, such as diminished reality effects, may improve searches for particular objects during the viewing experience to better curate and aid a user's search or a users' focus.

In some implementations, based on determining that a first object is not the searched—for object (e.g., the keys have not yet been found), a method may include distinguishing the first object from other objects still being searched/assessed (e.g., objects on coffee table are turned to matte white after a user moves or touches them to visually remove from the search process). In some implementations, the search may be initiated based on user input, activity, or intention to use a visual search feature (e.g., "find my keys").

In some techniques described herein, other various implementations disclosed herein include devices, systems, and methods that determine, at a first device during a communication session with another device, an objective of another user to draw attention to a featured object (e.g., to look at a specific sculpture at a museum). In an exemplary embodiment, the first device may provide a visual effect to distinguish the featured object in a view of an environment (physical, virtual, mixed reality (MR), etc.). In one example, based on identifying a featured object (e.g., a specified sculpture), the featured object may be visually distinguished from other objects in a view of the environment, e.g., using diminished reality effects on the other objects. For example, the first device may visually diminish (e.g., remove, blur, make translucent) other sculptures or other objects in the museum (e.g., art wall hangings).

In some implementations, the process of visually distinguishing one object from other objects may be initiated based on user input, activity, or intention to use an attention control feature (e.g., "look at this sculpture"). In another example, based on determining the second user is broadcasting (e.g., in a presenter/synchronous mode) and/or is looking at or interacting with an object, the first user's device applies diminished reality effects to the surrounding objects or area except for the feature object. For example, one user may be giving a cooking demo, and whatever ingredient or tool(s) the presenter is looking at or interacting with can be communicated to the audience, where the audience devices may visually diminish the other ingredients or tools so the audience can focus on what the presenter is demonstrating.

In general, one innovative aspect of the subject matter described in this specification can be embodied in methods that include the actions of, at a first electronic device operated by a first user, the first device having a processor, presenting a view of an environment including one or more objects during a communication session involving a second device, determining, during the communication session, an objective of a second user of the second device corresponding to identifying a featured object in the environment, and in accordance with the determined objective, providing a view of the environment with a visual effect.

These and other embodiments can each optionally include one or more of the following features.

In some aspects, determining the objective of the second user of the second device corresponding to identifying the featured object in the environment is based on determining a context indicative of a desired action. In some aspects, determining the context indicative of the desired action includes determining that the second device is broadcasting in a synchronous mode. In some aspects, determining the context indicative of the desired action includes determining that the second user is looking at or interacting with the featured object. In some aspects, determining the objective of the second user of the second device corresponding to identifying the featured object in the environment is based on an instruction from the second user.

In some aspects, the instruction includes a user command to identify the featured object in the environment. In some aspects, the instruction is a verbal command.

In some aspects, determining the objective of the second user of the second device corresponding to identifying the featured object in the environment is based on physiological data obtained via one or more sensors.

In some aspects, the physiological data includes a direction of a gaze, a velocity of the gaze, positional information and velocity information for a left eye and a right eye, interpupillary distance (IPD) between a right eye and a left eye, and a diameter of the left eye and a diameter of the right eye, pupillary fixations, or an image of an eye or electrooculography (EOG) data. In some aspects, the physiological data includes tracking a pose and a movement of a hand or a head.

In some aspects, in accordance with identifying the featured object in the environment, providing visual effects for a subset of objects of the one or more objects that are within a proximity threshold to the featured object.

In some aspects, in accordance with identifying the featured object in the environment, providing the view of the environment with diminished reality effects.

In some aspects, providing the view of the environment with diminished reality effects includes at least one of removing a second object from the view of the environment, blurring a third object within the view of the environment, applying a translucent visual effect to a fourth object within the view of the environment, applying a white-out or grey-out visual effect to a fifth object within the view of the environment, applying a matte white visual effect to a sixth object within the view of the environment, or applying a frosted glass visual effect to a seventh object within the view of the environment.

In some aspects, in accordance with a determination that the identified featured object is within the view of the environment, the method further includes presenting a featured object element corresponding to the identified featured object within the view of the environment. In some aspects, in accordance with determining that the identified featured object is excluded from the view of the environment, the method further includes presenting a notification element corresponding to the identified featured object within the view of the environment.

In some aspects, determining the objective of the second user of the second device is based on an object detection technique that identifies occlusions between a portion of the one or more objects.

In some aspects, identifying the featured object in the environment is based on detecting one or more surfaces in the environment.

In some aspects, the method further includes obtaining depth-based data corresponding to the environment; and determining, based on the determined objective and the depth-based data, that a first object of the one or more objects in the environment is the featured object. In some aspects, the depth-based data includes a depth image of the environment. In some aspects, the depth-based data includes a 3D representation of the environment.

In some aspects, the environment is a physical environment. In some aspects, the environment is a virtual environment. In some aspects, the view of the environment includes an extended reality (XR) experience. In some aspects, the first device or the second device is a head-mounted device (HMD).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
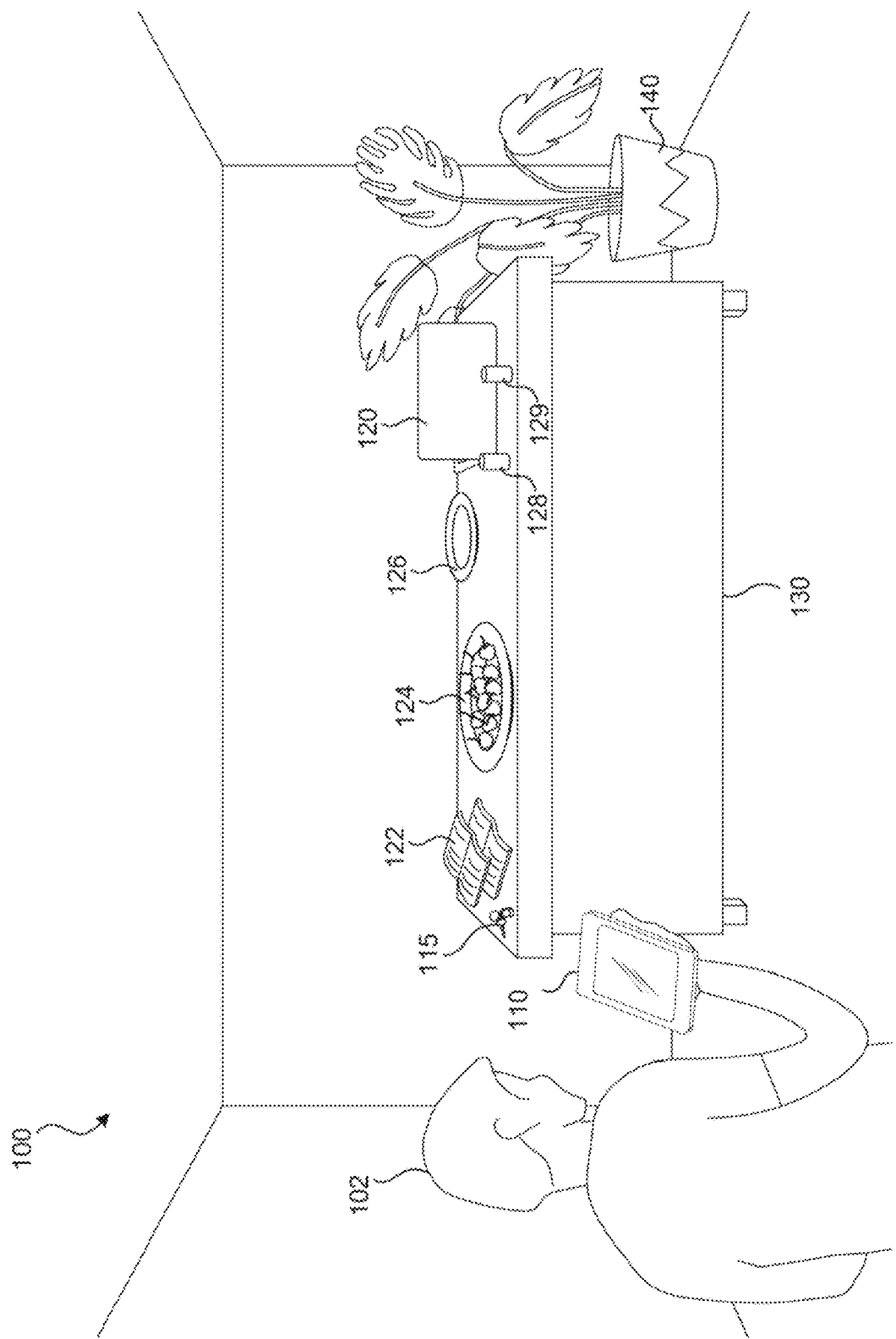
FIG. 1 illustrates an electronic device in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary physical environment 100. FIG. 1 illustrates an exemplary electronic device 110 operating in a room of the physical environment 100. In this example, the room includes a desk 130 and a plant 140, and on top of the desk 130 includes several objects such as a set of keys 115, a laptop 120, books 122, a plate of fruit 124, a dish 126, a first cup 128, and a second cup 129.

The electronic device 110 is illustrated as a single, hand-held device. The electronic device 110 may be a mobile phone, a tablet, a laptop, and so forth. In some implementations, electronic device 110 is worn by a user. For example, electronic device 110 may be a watch, a head-mounted device (HMD), a head-worn device that includes transparent lenses (e.g., smart glasses), headphones, an ear-mounted device, and so forth. The device 110 may utilize one or more display elements to present views. For example, the device 110 can display views that include content in the context of an extended reality (XR) environment. In some implementations, the device 110 may enclose the field-of-view of the user 102. In some implementations, the functionalities of device 110 is provided by more than one device. In some implementations, the device 110 communicates with a separate controller or server to manage and coordinate an experience for the user. Such a controller or server may be located in or may be remote relative to the physical environment 100.

The electronic device 110 includes one or more cameras, microphones, depth sensors, motion sensors, or other sensors that can be used to capture information about and evaluate the physical environment 100. The obtained sensor data may be used to generate a 3D representation, such as a 3D point cloud, a 3D mesh, a 3D floor plan, and/or a 3D room plan.

In one example, the one or more sensors can capture information about the head, face, and/or body of the user 102 to generate 3D representation data associated with the user 102 that can be used to generate an accurate, live/real-time 3D representation (e.g., avatar) of the user 102. For example, the device 110 may obtain image data, motion data, and/or physiological data (e.g., pupillary data, facial feature data, etc.) from the user 102 via a plurality of sensors. For example, the device 110 obtains eye gaze characteristic data via a first sensor, upper facial feature characteristic data via a second sensor, lower facial feature characteristic data and/or upper torso data via a third sensor, and other body data such as hand movements via a fourth external facing sensor. The user data (e.g., upper facial feature characteristic data, lower facial feature characteristic data, body data, eye gaze characteristic data, etc.) may vary in time and the device 110 may use the user data to generate and/or provide a 3D representation of the user. In some implementations, the user data includes texture data of the facial features such as eyebrow movement, chin movement, nose movement, cheek movement, etc. For example, when a person (e.g., user 102) smiles, the upper and lower facial features can include a plethora of muscle movements that may be replicated by a representation of the user (e.g., an avatar) based on the captured data from the one or more sensors.

FIGS. 2A-2E illustrate example views of the physical environment 100 provided by the device of FIG. 1 in accordance with some implementations. For instance, FIGS. 2A-2E illustrate example views 205A-205E, respectively, provided by the display elements of the device 110. Each view 205 presents an XR environment 215 that includes aspects of a physical environment (e.g., environment 100 of FIG. 1). The XR environment may include pass through video, live camera view, a 3D representation of the physical environment, a mixed reality (MR) environment, and the like.

The views 205A-205E depicted in FIGS. 2A-2E each provide a view of the physical environment 100 from a viewpoint standing behind the desk 130 and facing towards the top of the desk 130 for a close view for each item on top of the desk 130. For example, each view 205A-205E includes representations of the object(s) that are not occluded from a view from the user 102 (e.g., pass through video), and for objects that may be occluded from the current viewpoint (e.g., second cup 129, or the lost keys 115 the user is searching for) will be further discussed herein. For example, each view 205A-205E includes a representation 230 of the desk 130, a representation 220 of the laptop 120, a representation 222 of the books 122, a representation 224 of the plate of fruit 124, a representation 226 of the dish 126, and a representation 228 of the first cup 128. However, the viewpoint as shown is for illustrative purposes only, as alternate viewpoints may be shown for the view 205 as the user moves throughout the physical environment 100. The illustrated representations may be images (e.g., video) of the actual objects, may be views of each physical object as seen through a transparent or translucent display, may be virtual content that represents each physical object, or the representations may be a combination of virtual content and images and/or pass-through video (e.g., an XR experience).

Figure 2A:
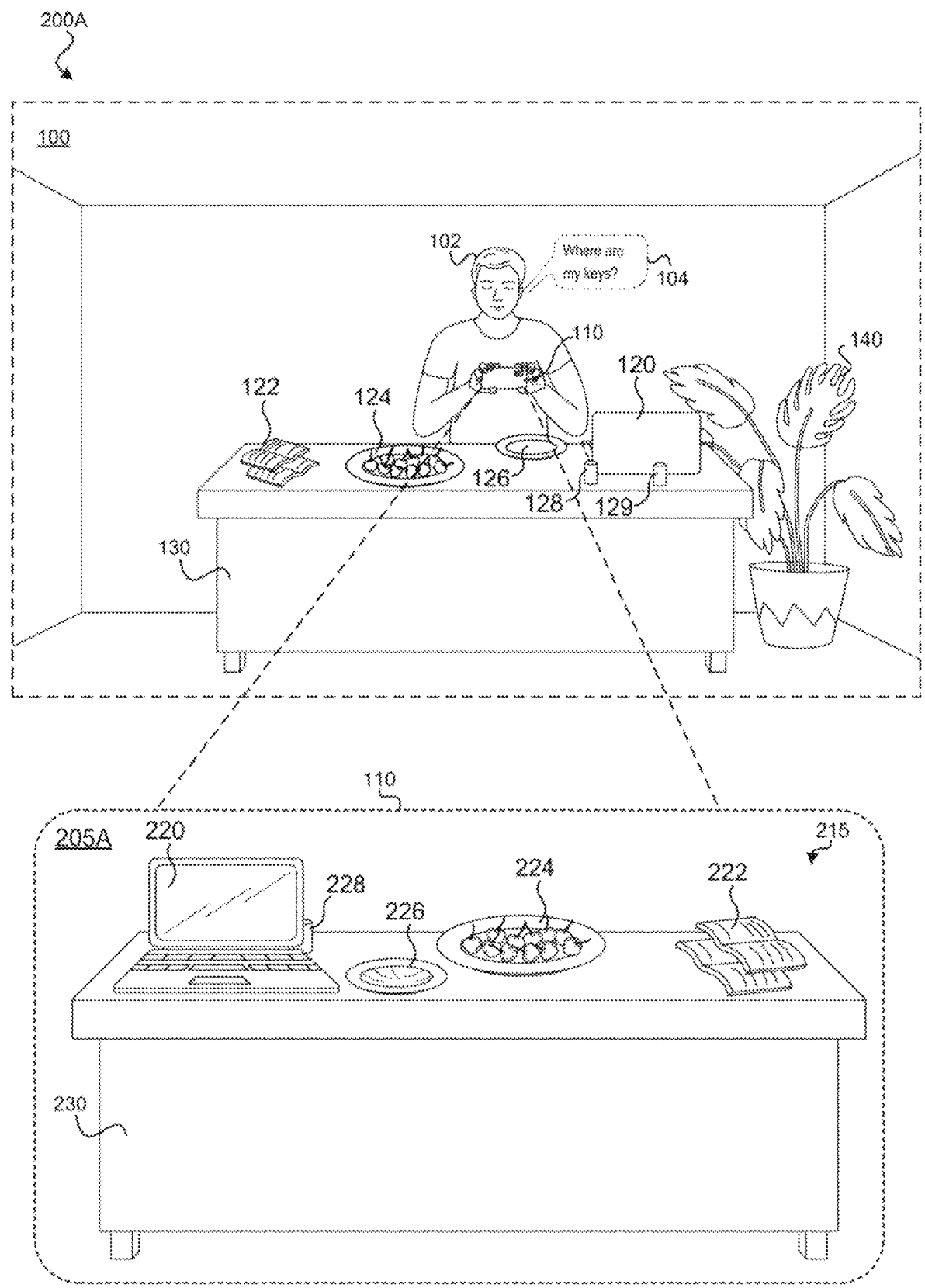
FIGS. 2A-2E illustrate example views provided by the device of FIG. 1 in accordance with some implementations.

FIG. 2A illustrates a view 205A that presents representations of the objects for a regular/normal view (e.g., no visual effects) based on determining an objective (e.g., user's intention or request for a visual search aide) corresponding to identifying a searched—for object (e.g., a misplaced set of keys 115). For example, the user 102 is viewing the XR environment 215, such as a generated 3D representation of the physical environment 100, passthrough video of the physical environment 100, or the like, and makes a verbal statement: "Where are my keys?" as illustrated by the narration 104. The statement or command may initiate a visual search aide technique by the device 110. Additionally, or alternatively, a search may be initiated by other commands or input by the user 102, such as selecting a search feature/button on the display of device 110, typing in the command, etc. Additionally, or alternatively, a search may be initiated by character/script commands, smart placements, a context indicative of a desired action, a narrative, etc. Additionally, or alternatively, a search may be initiated by tracking the user's 102 physiological and/or physical characteristics, such as tracking a user's eye gaze characteristics (e.g., eye are looking around the room in a search mode) or tracking the movements of the user's hands/body (e.g., pointing towards an area to search).

Figure 2B:
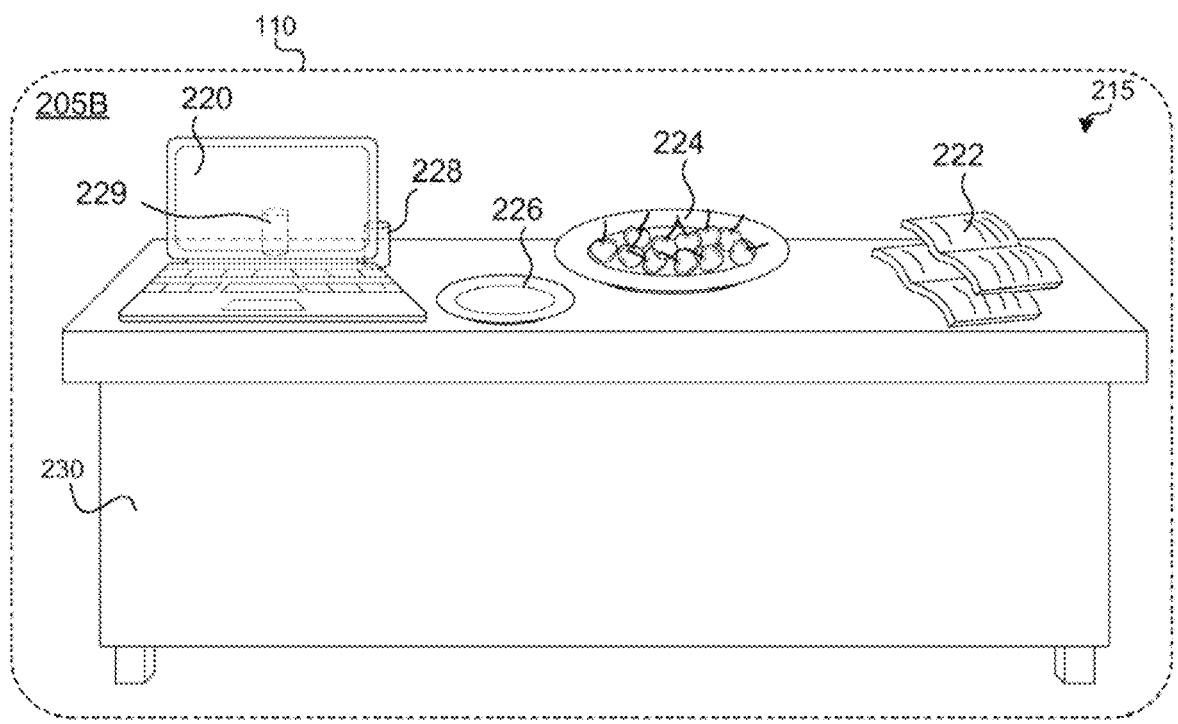
Figure 2C:
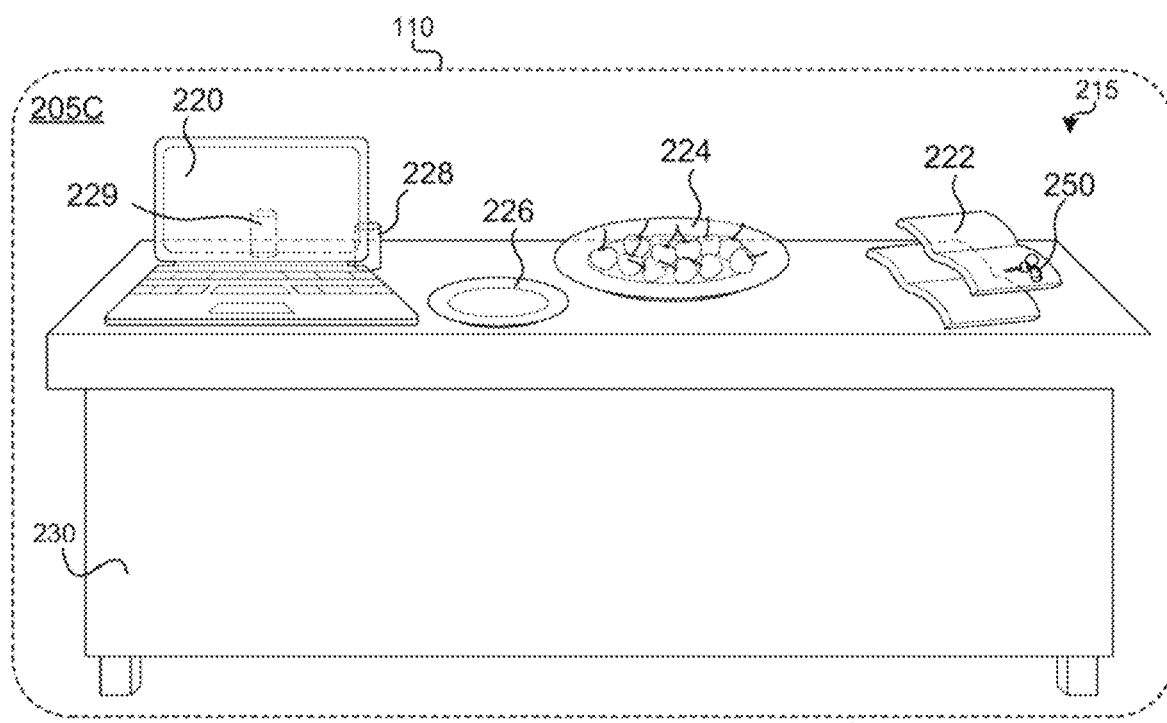

FIGS. 2B-2E each illustrate different views 205B-205E, respectively, that include one or more different visual effects based on determining an objective (e.g., user's 102 intention or request for a visual search aide) corresponding to identifying a searched—for object (e.g., a misplaced set of keys 115) in the physical environment 100. For instance, view 205B of FIG. 2B illustrates a visual search aide technique being applied for the left side of the top of the representation 230 of the desk 130 during the search for the lost keys 115. For example, the representation 220 of the laptop 120 is now transparent such that the occluded representation 229 of the second cup 129 is now visible within the view 205B. Additionally, view 205B illustrates a visual effect upon the representation 226 of the plate 126 (e.g., white/greyed out or matte white effect). View 205C of FIG. 2C illustrates a visual search aide technique being applied for the remaining portion of the top of the representation 230 of the desk 130 during the search for the lost keys 115 (e.g., following the scan of the left side as illustrated by view 205B of FIG. 2B). For example, view 205B illustrates a visual effect upon the representation 224 of the fruit 124 (e.g., white/greyed out or matte white effect), as well as applying a transparent effect to see the edge of the representation 230 of the desk 130. Additionally, view 205C illustrates a similar visual effect upon the representation 222 of the books 122 (e.g., white/greyed out or matte white effect), as well as applying a transparent effect such that the representation 250 for the misplaced set of keys 115 can be visualized for the user 102 through the representation 222 of the books 122.

Figure 2D:
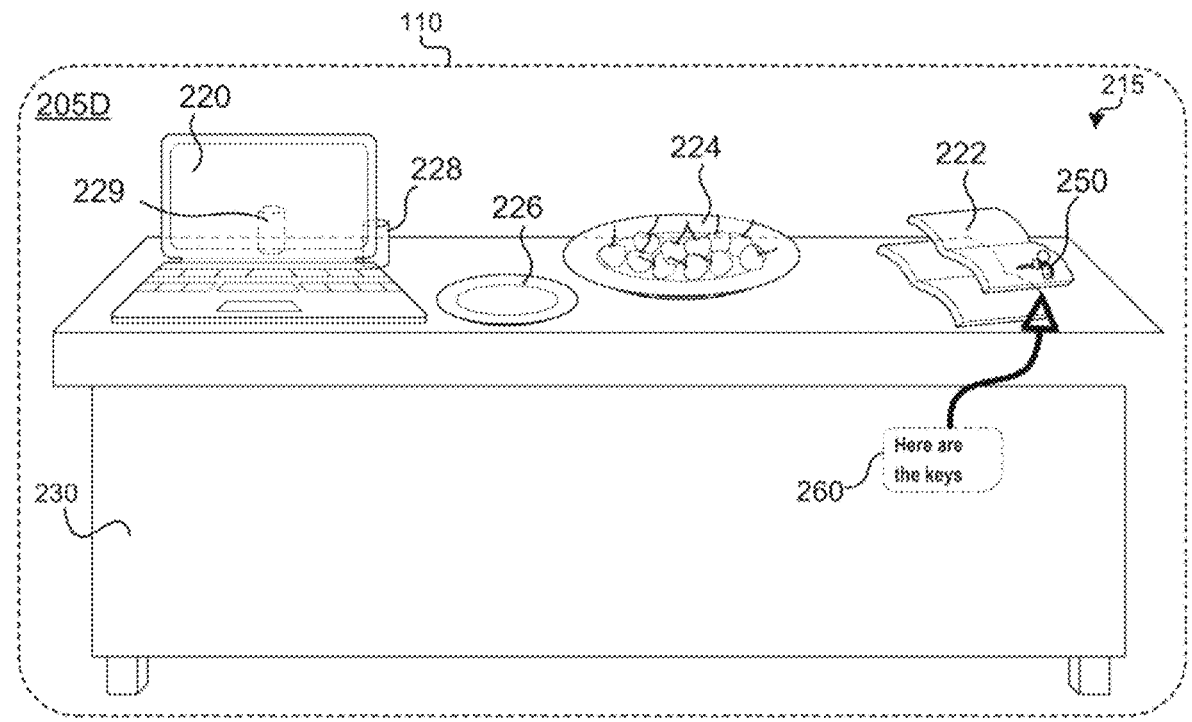
Figure 2E:
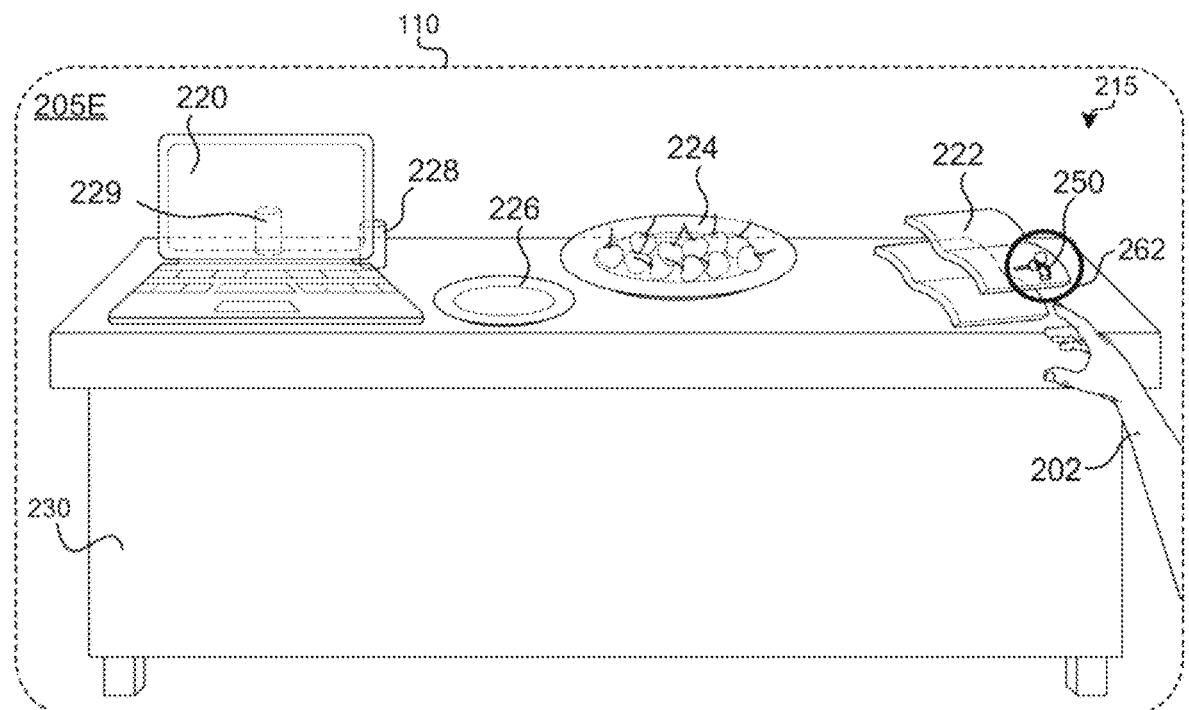

View 205D of FIG. 2D and view 205E of FIG. 2E are both similar to the view 205C of FIG. 2C (e.g., the visual search aide technique has been applied to the top of the representation 230 of desk 130 and applied visual effects to each searched for object). However, view 205D includes the notification 260 that includes an arrow pointing to the representation 250 of the misplaced keys 115 as well as a visual text box (e.g., "Here are the keys"), and view 205E includes an indication 262 that circles the representation 250 of the misplaced keys 115 and provides a representation 202 of the user 102 (e.g., the arm of the user 102 as he or she is reaching out for the misplaced keys 115).

In some implementations, the movement of the user 102 for reaching out towards an area within the XR environment 215 may initiate the visual search aide technique described herein. For example, before the user initiated the visual search aide technique by stating "Where are my keys?" as illustrated in FIG. 2A, the visual search aide technique may be initiated based on cues from the user 102, such as reaching towards an area in search for the misplaced item. Additionally, or alternatively, the visual search aide technique may be initiated based on the user's gaze characteristics. For example, as the user searches for the keys 115 with his or her eye gaze, the visual search aide technique may be initiated based on determining that the user 102 is searching for an item.

In some implementations, the device 110 may scan the physical environment either one time or continuously during use of the device 110 by the user 102 and track each object. For example, the visual search aide technique may track and store location information for each identified object in the physical environment 100 while the user 102 moves throughout the environment 100 (e.g., or leaving the room and coming back), such that when the user initiates the visual search aide technique by the various means described herein (e.g., user commands, scripted, etc.), the device 110 may know the location of the searched—for object and immediately show the object to the user 102, as visualized for the representation 250 for the misplaced keys 115 in views 205C-205E.

It should be appreciated by one skilled in the art that several different diminished reality visual effects may be included that may not be visually represented accurately in the black/white illustrations for FIGS. 2A-2E, and that other diminished reality type of visual effects may be applied to each representation of objects to improve the visual search aide technique (e.g., coloring different types of objects, remove, blur, make translucent, white/grey out, matte white, frosted glass, etc.).

Figure 3:
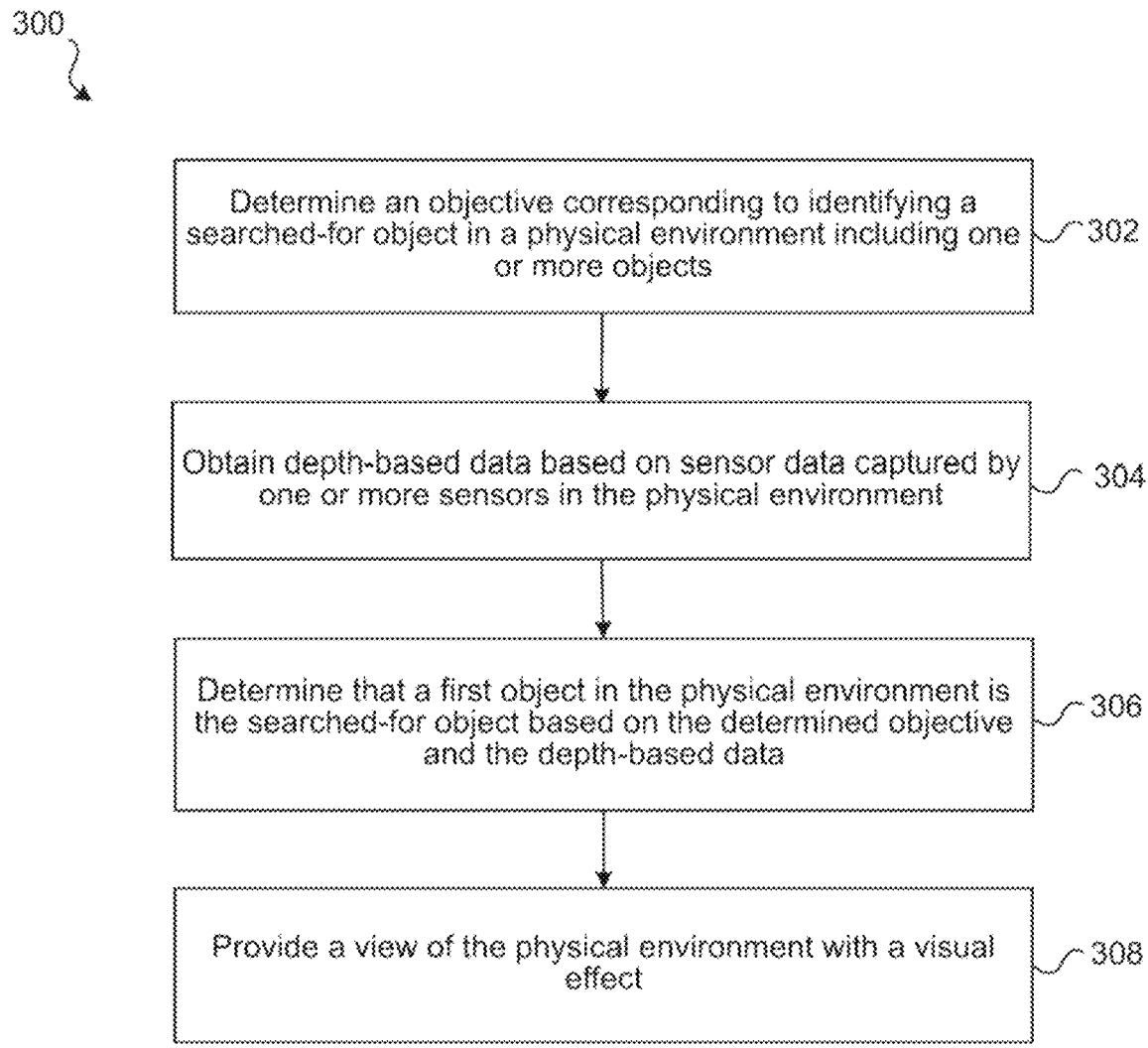
FIG. 3 is a flowchart illustrating a method for providing a view of an environment with a visual effect associated with a searched—for object based on a determined objective and depth-based data in accordance with some implementations.

FIG. 3 is a flowchart illustrating a method 300 for providing a view of an environment with a visual effect associated with a searched—for object based on a determined objective and depth-based data in accordance with some implementations. In particular, method 300 provides a visual effect to distinguish an object in a view of an environment based on using depth-based data (e.g., 3D data) to determine whether the object is a searched—for object (e.g., a lost set of keys) by visually distinguishing the first object from other objects in a view of the environment. In some implementations, a device such as electronic device 110 performs method 300. In some implementations, method 300 is performed on a mobile device, desktop, laptop, HMD, or server device. The method 300 is performed by processing logic, including hardware, firmware, software, or a combination thereof. In some implementations, the method 300 is performed on a processor executing code stored in a non-transitory computer-readable medium (e.g., a memory).

At block 302 the method 300 determines an objective corresponding to identifying a searched—for object in a physical environment including one or more objects. For example, the objective may be a user's intention or request for a visual search aide. In some implementations, the objective may be determined based on user input such as verbal commands or entering the commands on a keyboard. Additionally, or alternatively, in some implementations, the objective may be determined based on character/script commands, smart placements, context indicative of a desired action, narrative, tracking a user's eye gaze characteristics (e.g., eye are looking around the room in a search mode), etc In some implementations, determining the objective corresponding to identifying the searched—for object in the physical environment is based on an instruction from a user. In some implementations, the instruction includes a user command to identify the searched—for object in the physical environment. In some implementations, the instruction is a verbal command. For example, as illustrated in FIG. 2A, the user 102 makes a verbal statement: "Where are my keys?" as illustrated by the narration 104, and that verbal statement may initiate the visual search aide technique by the device 110.

In some implementations, determining the objective corresponding to identifying the searched—for object is determined based on determining a context indicative of a desired action. For example, the visual search aide technique by the device 110 may be initiated based on determining that the user has an appointment (e.g., by accessing the user's calendar application on the device), and thus the user needs to leave the room soon and would typically grab his or her keys before leaving the room.

In some implementations, determining the objective corresponding to identifying the searched—for object in the physical environment is based on physiological data obtained via the one or more sensors. For example, the visual search aide technique by the device 110 may be initiated based on tracking a user's eye gaze characteristics, e.g., eyes are looking around the room in a search mode, tracking hand movements (reaching for an object in a search mode), etc. In some implementations, the physiological data may include a direction of a gaze, a velocity of the gaze, positional information and velocity information for a left eye and a right eye, interpupillary distance (IPD) between a right eye and a left eye, and a diameter of the left eye and a diameter of the right eye, pupillary fixations (e.g., derived from eye gaze dynamics and saccade characteristics), an image of an eye or electrooculography (EOG) data, and the like. In some implementations, the physiological data includes tracking a pose and a movement of a hand or a head (e.g., a user reaching out looking for something).

At block 304 the method 300 obtains depth-based data based on sensor data captured by one or more sensors in the physical environment. For example, the depth-based data may be a depth image or a 3D representation of the physical environment. The sensor may include a light intensity camera, an inertial measurement unit (IMU), a depth sensor, a gyroscope, etc. The user may position the device to capture sensor data for a portion of a room or the depth-based data may be obtained from a different device. In some examples, the depth-based data is obtained after determining the objective corresponding to identifying a searched—for object at block 302. In other examples, the depth-based data is obtained before determining the objective corresponding to identifying a searched—for object at block 302.

At block 306 the method 300 determines whether a first object in the physical environment is the searched—for object based on the determined objective and the depth-based data. For example, a visual search aide technique may determine which objects are occluded via object recognition for a current scan or utilize prior object detection scans.

In some implementations, determining whether the first object in the physical environment is the searched—for object is based on an object detection technique that identifies occlusions between a portion of the one or more objects. For example, via object recognition techniques, it may be determined which objects are occluded from a view for the user from the current viewpoint.

In some implementations, determining whether the first object in the physical environment is the searched—for object is based on detecting one or more surfaces in the physical environment. For example, one or more surfaces may be detected, e.g., a surface of a desk, floor, etc., such as the surface of the desk 130. The one or more surfaces may also be determined and used to facilitate object identification to be more efficient (e.g., searching for the misplaced keys 115 only on the surface of the desk 130).

At block 308 the method 300 provides a view of the physical environment with a visual effect (e.g., in accordance with determining that the first object is the searched—for object). For example, if the first object is the searched—for object, this may involve providing diminished reality effects for one or more of the other objects that are within proximity to the first object. Diminished reality effects may erase, de-emphasize, or otherwise diminish external stimuli (e.g., remove, blur, make translucent, white/grey out, matte white, frosted glass, etc.) to preserve spatial awareness of the objects that are diminished. For example, in the exemplary embodiment, the goal is to keep track of objects/areas that the user has searched. Keeping track of these searched areas may be based on locations that the user actually gazed at, or areas where the user interacted with (e.g., using his or her hands). This is particularly helpful when the device is not able to detect the object in an image and/or when the device doesn't already know where the object is (e.g., based on historical scans).

Additionally, or alternatively, in some implementations, if the first object is not the searched—for object, a visual effect may be applied to the object indicating that the identified object is not the searched for object/has already been searched (e.g., apply different visual effects for each area of the room or object that has been scanned or ruled out from the search for the searched—for object, e.g., the misplaced keys). In some implementations, the view of the physical environment includes an extended reality (XR) experience.

In some implementations, in accordance with determining that the first object is the searched—for object, providing the view of the physical environment with the visual effect may include providing visual effects for a subset of objects of the one or more objects that are within a proximity threshold to the first object. For example, the visual search aide technique by the device 110 may only apply the visual effects around the representation 222 of the books 122, which is the area near the misplaced keys 115. The threshold may be based on a distance, such as applying visual effects within two feet of the location of the searched—for object.

In some implementations, in accordance with determining that the first object is the searched—for object, providing the view of the physical environment with the visual effect may include providing the view of the physical environment with diminished reality effects. For example, the visual search aide technique by the device 110 may know the location of the keys 115, and when initiated (e.g., by the user's verbal command), would apply diminished reality effects to one or more objects to aide in finding the keys 115. In some implementations, providing the view of the physical environment with diminished reality effects includes at least one of removing a second object from the view of the physical environment, blurring a third object within the view of the physical environment, applying a translucent visual effect to a fourth object within the view of the physical environment, applying a white-out or grey-out visual effect to a fifth object within the view of the physical environment, applying a matte white visual effect to a sixth object within the view of the physical environment, or applying a frosted glass visual effect to a seventh object within the view of the physical environment. For example, diminished reality effects may include erasing a representation of an object, de-emphasize, or otherwise diminish external stimuli (e.g., remove, blur, make translucent, white/grey out, matte white, frosted glass, etc.) to preserve spatial awareness of the objects that are diminished.

In some implementations, in accordance with determining that the first object is the searched—for object, the method 300 further includes presenting a notification element corresponding to the first object that is identified as the searched—for object within the view of the physical environment. For example, as illustrated in view 205D of FIG. 2D, the notification 260 is presented that includes an arrow pointing to the representation 250 of the misplaced keys 115 as well as a visual text box (e.g., "Here are the keys").

In some implementations, in accordance with determining that the first object is not the searched—for object (e.g., the misplaced keys 115 are in an unknown location), providing the view of the physical environment with the visual effect includes providing the view corresponding to the first object. For example, a visual effect can be applied to an object indicating that the identified object is not the searched for object and has already been searched (e.g., using a color scheme or white out effect for each object that has been searched for).

Figure 4:
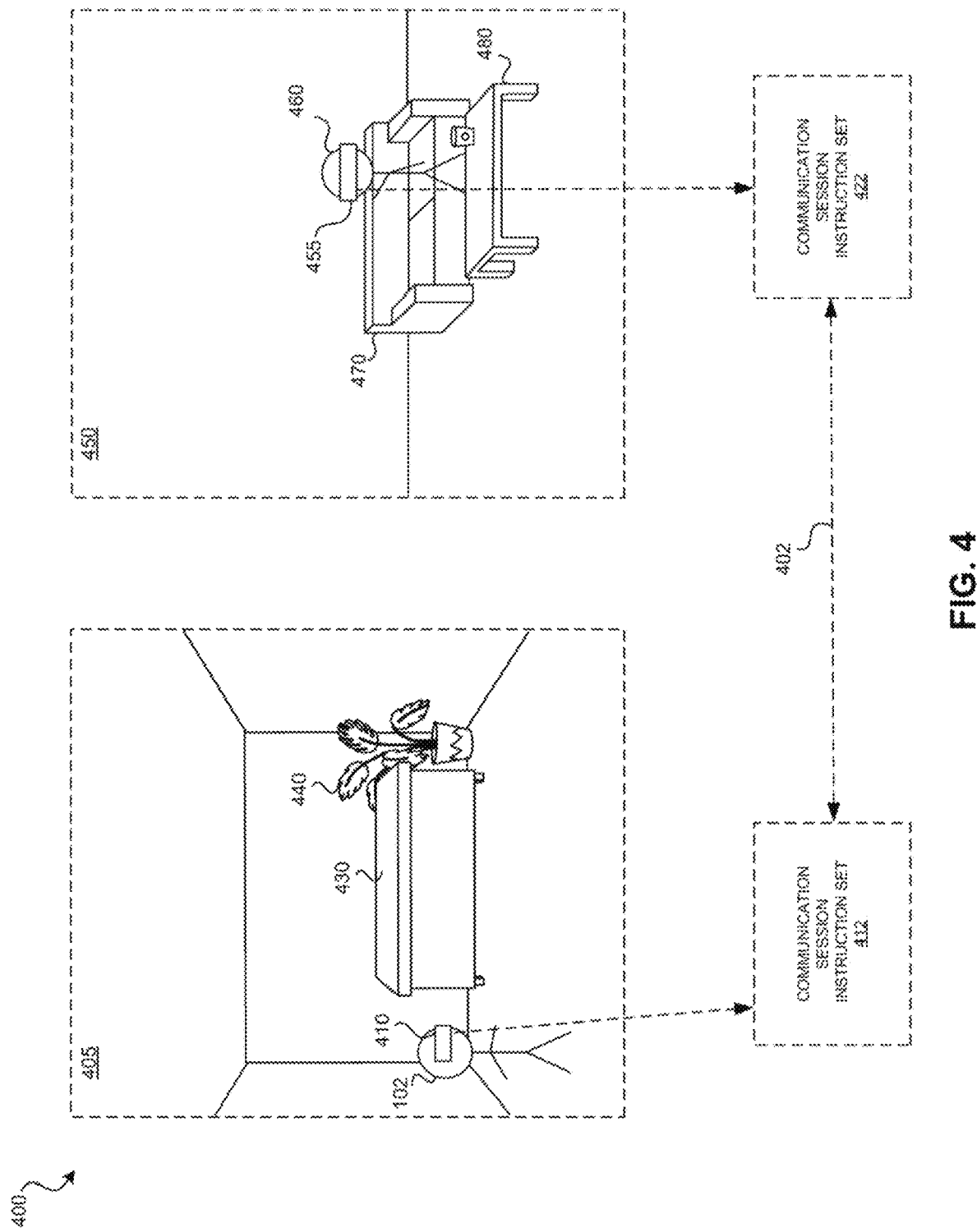
FIG. 4 illustrates exemplary electronic devices operating in different physical environments during a communication session in accordance with some implementations.

FIG. 4 illustrates exemplary operating environment 400 of electronic devices 410, 455 operating in different physical environments 405, 450, respectively, during a communication session, e.g., while the electronic devices 410, 455 are sharing information with one another or an intermediary device such as a communication session server. In this example of FIG. 4, both electronic devices 410, 455 are illustrated as HMDs during a communication session, however, the electronic devices 410, 455 may be other types of devices that are capable of generating and/or transmitting 3D representation data during a communication session.

In this example of FIG. 4, the physical environment 405 (e.g., from physical environment 100 of FIG. 1) is a room that includes a desk 430 and potted flowers 440. The electronic device 410 includes one or more cameras, microphones, depth sensors, or other sensors that can be used to capture information about and evaluate the physical environment 405 and the objects within it, as well as information about the user 102 of the electronic device 410. The information about the physical environment 400 and/or user 102 may be used to provide visual and audio content during the communication session. For example, a communication session may provide views to one or more participants (e.g., users 102, 460) of a 3D environment that is generated based on camera images and/or depth camera images of the physical environment 405 as well as a representation of user 102 based on camera images and/or depth camera images of the user 102.

In this example, the physical environment 450 is a room that includes a sofa 470 and a coffee table 480. The electronic device 455 includes one or more cameras, microphones, depth sensors, or other sensors that can be used to capture information about and evaluate the physical environment 450 and the objects within it, as well as information about the user 460 of the electronic device 455. The information about the physical environment 450 and/or user 460 may be used to provide visual and audio content during the communication session. For example, a communication session may provide views of a 3D environment that is generated based on camera images and/or depth camera images (from electronic device 455) of the physical environment 450 as well as a representation of user 460 based on camera images and/or depth camera images (from electronic device 455) of the user 460. For example, a 3D environment may be sent by the device 410 by a communication session instruction set 412 in communication with the device 455 by a communication session instruction set 422 (e.g., via network connection 402). However, it should be noted that representations of the users 102, 460 may be provided in other 3D environments. For example, a communication session may involve representations of either or both users 102, 460 that are positioned within any entirely virtual environment or an extended reality (XR) environment that includes some physical environment representations and some virtual environment representations.

Figure 5B:
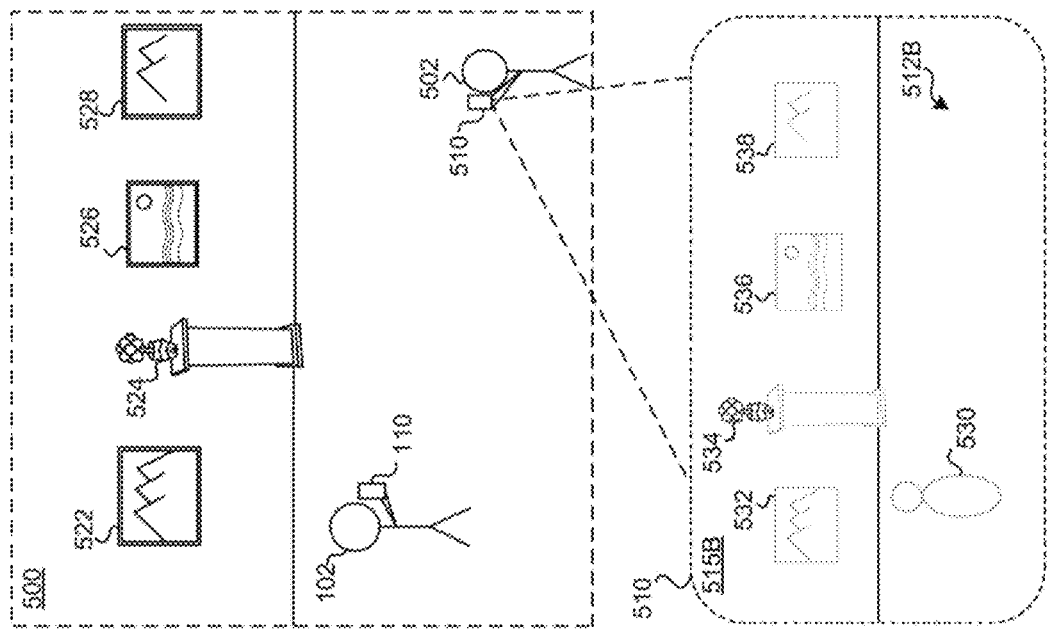
FIGS. 5A and 5B illustrate exemplary views of an electronic device during a communication session in the same physical environment, in accordance with some implementations.
Figure 5A:
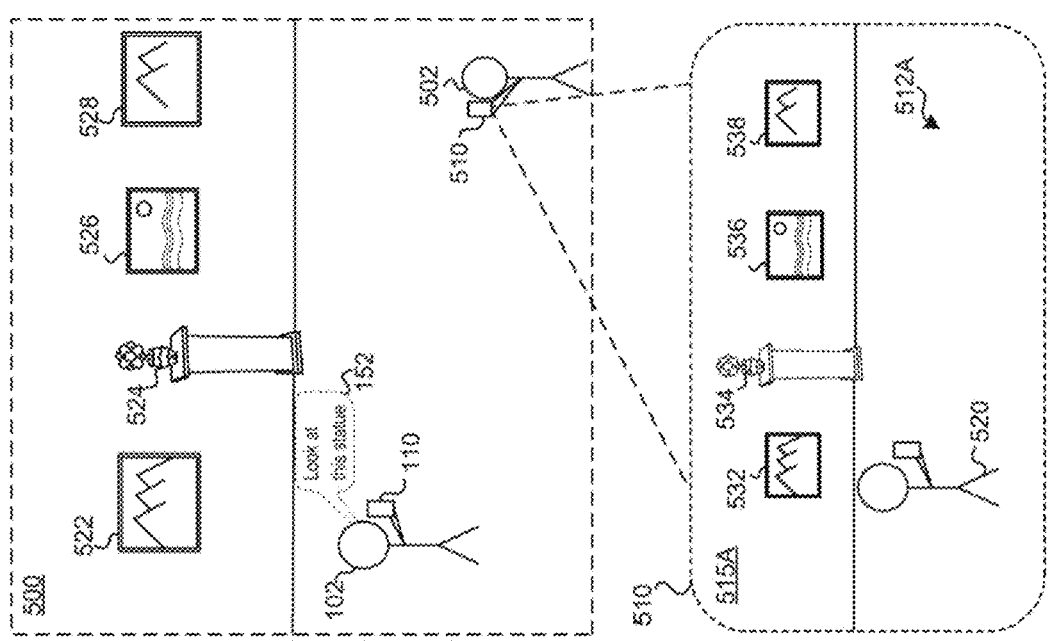

FIGS. 5A and 5B illustrate exemplary views of an electronic device during a communication session in the same physical environment, where each view is of an extended reality (XR) environment, in accordance with some implementations. In these examples of FIGS. 5A and 5B, the physical environment 500 is a room (e.g., a particular room or exhibit of a museum) that includes a first wall hanging 522, a statue 524, a second wall hanging 526, and a third wall hanging 528. For instance, FIGS. 5A and 5B illustrate an exemplary electronic device 510 providing view 515A of 3D environment 512A, and view 515B of 3D environment 512B, respectively, during a communication session between devices 110 and 510 and operating in the same physical environment 500 (e.g., a museum) and at two different periods of time. In particular, FIG. 5A, for a first period of time, illustrates user 102 standing in front of the first wall hanging 522, facing the statue 524, and speaking to the user 502 as illustrated by the narration 152 (e.g., "Look at this statue"). FIG. 5B, for a second period of time, illustrates the same user 102 remaining in the same location as the first time period for FIG. 5A, e.g., standing in front of the first wall hanging 522 and facing the statue 524, but moments later (e.g., a couple of seconds after the user 102 tells user 502 to look at the statue 524).

A viewing session may provide views of a 3D environment (e.g., 3D environment 512A and 512B) that is generated based on current camera images and/or depth camera images of the physical environment 500 from electronic device 510 as well as a representation 520 of user 102 for FIG. 5A, and representation 530 of user 102 for FIG. 5B, based on camera images and/or depth camera images of the user 102. In the example illustrated in FIGS. 5A and 5B, the electronic device 510 provides a view 515A, 515B, respectively, that enables user 502 to view a representation 532 of the first wall hanging 522, a representation 534 of the statue 524, a representation 536 of the second wall hanging 526, and a representation 538 of the third wall hanging 528. Additionally, view 515A for FIG. 5A illustrates a representation 520 of user 102 that looks like the user 102 (e.g., pass through video, live camera view, optical see-through, etc.) within a 3D environment 512A, and view 515B for FIG. 5B illustrates a representation 530 of user 102 that looks like generated content (e.g., a generated avatar, an image, a video, etc.) of at least a portion of the user 102 (e.g., from mid-torso up) within a 3D environment 512B.

However, the differences presented in the examples illustrated in the view 515B of FIG. 5B illustrates the electronic device 510 providing a view 515B that includes diminished reality effects as described herein. For example, based on the narration 152 detected by the device 510, the system of device 510 using techniques described herein, provides a visual effect to other objects so that the featured object (e.g., representation 534 of statue 524) is distinguished from other objects within the view 515B. In particular, the view of the representation 532 of the first wall hanging 522, the view of the representation 534 of the statue 524, the view of the representation 536 of the second wall hanging 526, the view of the representation 538 of the third wall hanging 528, the view of the stand for the representation 534 of the statue 524, and the view of the representation 530 of the user 102 within the 3D environment 512B, for the second time period, are all shown with visual effects (e.g., diminished reality effects). For example, each representation for the objects discussed herein is illustrated as being white out or faded. However, other visual effects may be utilized to erase, de-emphasize, or otherwise diminish external stimuli (e.g., remove, blur, make translucent, white/grey out, matte white, frosted glass, etc.) to preserve spatial awareness of the objects that are diminished.

Figure 6:
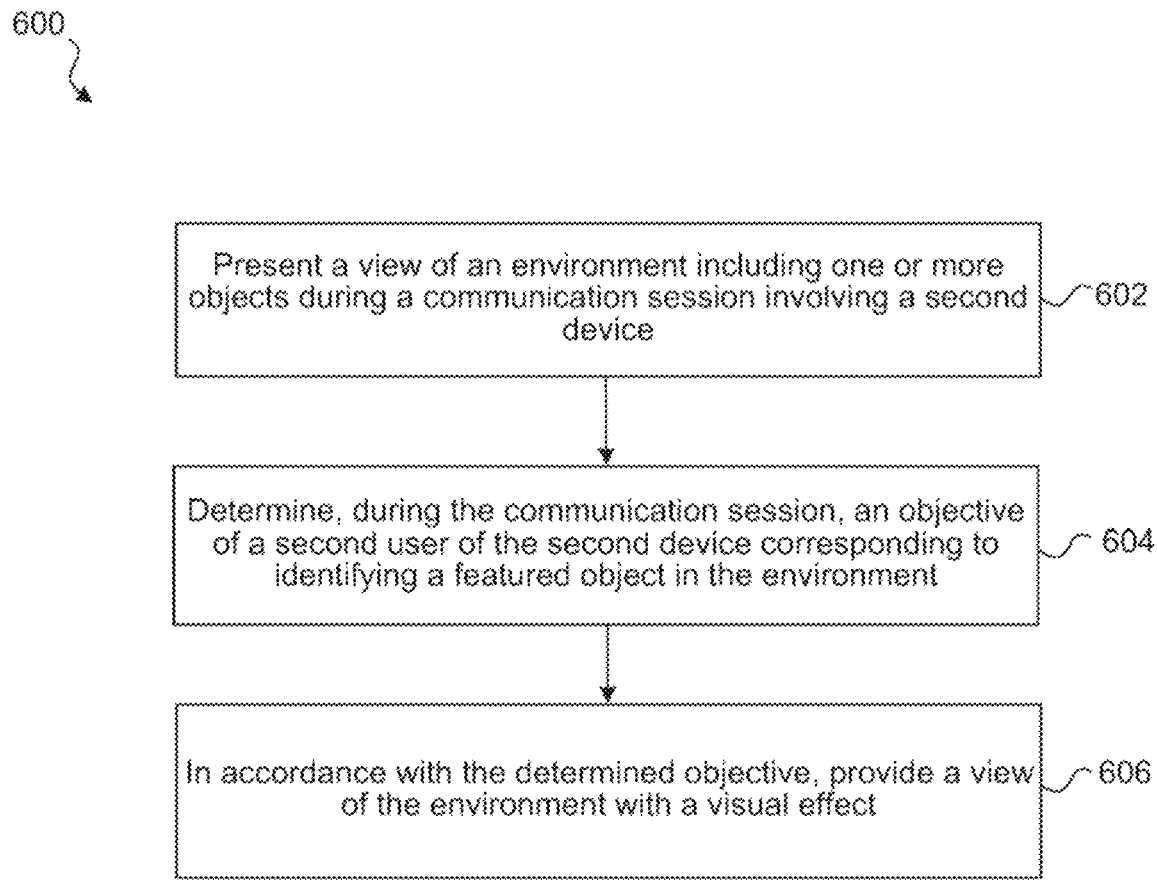
FIG. 6 is a flowchart illustrating a method for providing a view of an environment with a visual effect based on a determined objective during a communication session in accordance with some implementations.

FIG. 6 is a flowchart illustrating a method 600 for providing a view of an environment with a visual effect based on a determined objective during a communication session in accordance with some implementations. In particular, method 600 determines (at a first device during a communication session) an objective of another user to draw attention to a featured object, e.g., a specific sculpture, and the first device provides a visual effect to distinguish the featured object in a view of an environment (e.g., physical, virtual, MR, etc.). In some implementations, a device such as electronic device 110 performs method 600. In some implementations, method 600 is performed on a mobile device, desktop, laptop, HMD, or server device. The method 600 is performed by processing logic, including hardware, firmware, software, or a combination thereof. In some implementations, the method 600 is performed on a processor executing code stored in a non-transitory computer-readable medium (e.g., a memory).

At block 602, at a first device operated by a first user, the method 600 includes presenting a view of an environment including one or more objects during a communication session involving a second device. For example, the first device is a receiving device, and the second device is a presenting device for a speaker (e.g., a presenter to another device, e.g., in a museum, or to multiple devices, e.g., cooking demonstration to an audience). The view of the environment can be a view of a physical environment, a virtual environment, or a view of MR environment, i.e., an XR experience.

At block 604 the method 600 determines, during the communication session, an objective (e.g., of a second user of the second device) corresponding to identifying a featured object in the environment. For example, the objective may be a user's intention or request for a visual search aide and identifying a featured object in the environment may be a process of drawing attention to the featured object (e.g., drawing attention to a particular sculpture). In some implementations, the objective may be determined based on user input such as verbal commands or entering the commands on a keyboard. Additionally, or alternatively, in some implementations, the objective may be determined based on character/script commands, smart placements, context indicative of a desired action, narrative, tracking a user's eye gaze characteristics (e.g., eye are looking around the room in a search mode), etc. In some implementations, the identifying the featured object may be based on hand/head movement (e.g., pointing at the sculpture), etc.).

In some implementations, determining the objective (e.g., of the second user of the second device) corresponding to identifying the featured object in the environment is based on determining a context indicative of a desired action. For example, determining the objective of the second user may include determining that the second user is a presenter to another device, e.g., in a museum, or to multiple devices, e.g., cooking demonstration to an audience. In some implementations, determining the context indicative of the desired action includes determining that the second device is broadcasting in a synchronous mode (e.g., in a presenter mode).

In some implementations, determining the objective of the second user of the second device corresponding to identifying the featured object in the environment is based on an instruction from the second user. For example, as illustrated in FIG. 5A, the user 102 (e.g., the presenter using device 110) makes a verbal statement: "Look at this statue." as illustrated by the narration 152, and that verbal statement may initiate the visual search aide technique by the device 510.

In some implementations, determining the context indicative of the desired action includes determining that the second user is looking at or interacting with the featured object. For example, in FIG. 5A, as opposed to the verbal statement, the context of drawing attention to the statue 524 may be determined based on the user 102 looking at (e.g., staring at) the statue 524 for a particular period of time, or the user 102 pointing towards or even touching the statue 524. Although touching the statue 524 may not be practical at a museum, the event may be a cooking demonstration, thus when the presenter is touching the next ingredient, then the featured object would be determined based on what the presenter is interacting with.

In some implementations, determining the objective of the second user of the second device corresponding to identifying the featured object in the environment is based on physiological data obtained via one or more sensors. For example, the visual search aide technique by the device 110 may be initiated based on tracking a user's eye gaze characteristics, e.g., eyes are looking around the room in a search mode, tracking hand movements (reaching for an object in a search mode), etc. In some implementations, the physiological data may include a direction of a gaze, a velocity of the gaze, positional information and velocity information for a left eye and a right eye, interpupillary distance (IPD) between a right eye and a left eye, and a diameter of the left eye and a diameter of the right eye, pupillary fixations (e.g., derived from eye gaze dynamics and saccade characteristics), an image of an eye or electrooculography (EOG) data, and the like. In some implementations, the physiological data includes tracking a pose and a movement of a hand or a head (e.g., a user reaching out looking for something).

At block 606 the method 600, in accordance with the determined objective, provides a view of the environment with a visual effect. For example, this may involve providing diminished reality effects for one or more of the other objects that are within proximity to the featured object. Diminished reality effects may erase, de-emphasize, or otherwise diminish external stimuli (e.g., remove, blur, make translucent, white/grey out, matte white, frosted glass, etc.) to preserve spatial awareness of the objects that are diminished. In some implementations, the view of the physical environment includes an extended reality (XR) experience.

In some implementations, in accordance with identifying the featured object in the environment, visual effects may be provided for a subset of objects of the one or more objects that are within a proximity threshold to the featured object. For example, the visual search aide technique by the device 510 may only apply the visual effects around the representation 534 of the statue 524 (e.g., the stand of the statue, and the nearest paintings, such as representation 532 of the wall hanging 522). The threshold may be based on a distance, such as applying visual effects within two feet of the location of the searched—for object.

In some implementations, in accordance with identifying the featured object in the environment, method 600 may include providing the view of the environment with diminished reality effects. For example, the visual search aide technique by the device 510 may know the location of the statue 524, and when initiated (e.g., by the user's verbal command), would apply diminished reality effects to one or more objects to aide in seeing the statue 524. In some implementations, providing the view of the environment with diminished reality effects includes at least one of removing a second object from the view of the environment, blurring a third object within the view of the physical environment, applying a translucent visual effect to a fourth object within the view of the environment, applying a white-out or grey-out visual effect to a fifth object within the view of the environment, applying a matte white visual effect to a sixth object within the view of the environment, or applying a frosted glass visual effect to a seventh object within the view of the environment. For example, diminished reality effects may include erasing a representation of an object, de-emphasize, or otherwise diminish external stimuli (e.g., remove, blur, make translucent, white/grey out, matte white, frosted glass, etc.) to preserve spatial awareness of the objects that are diminished.

In some implementations, in accordance with identifying the featured object is within the view of the environment, the method 500 further includes presenting a featured object element corresponding to the identified featured object within the view of the environment. For example, as illustrated in view 205D of FIG. 2D, the notification 260 is presented that includes an arrow pointing to the representation 250 of the misplaced keys 115 as well as a visual text box (e.g., "Here are the keys"), and a similar notification could be added to FIG. 5B (e.g., "Look at this statue," a replication of the detected spoken words of user 102).

In some implementations, in accordance with determining that the featured object is excluded from the view of the environment, the method 600 further includes presenting a notification element corresponding to the featured object within the view of the environment. For example, a visual effect or a notification element can be applied indicating that the featured object is currently not within view, and/or provide a visual effect to alert the viewer of a location if occluded from current view. For example, presenting a notification to alert the user to look behind an object for the featured object (e.g., "Look behind the statue" because it is blocking the view of another statue the presenter/speaker, e.g., user 102, is trying to get the viewer, e.g., user 502, to look at).

In some implementations, the method 600 further includes obtaining depth-based data corresponding to the environment, and determining, based on the determined objective and the depth-based data, that a first object of the one or more objects in the environment is the featured object (e.g., identifying the particular sculpture via object recognition, determining which objects are occluded, utilizing prior object detection scans, etc.). For example, the depth-based data may be a depth image, a 3D representation of a physical environment, or 3D mapping data associated with a virtual environment that maybe captured by a sensor that may include a camera, IMU, depth sensor, etc. In some implementations, the user may position the device to capture sensor data for a portion of a room or the depth-based data may be obtained from a different device.

In the example of FIGS. 1-6, the electronic devices described herein may be illustrated as a hand-held device. The electronic devices may be a mobile phone, a tablet, a laptop, so forth. In some implementations, electronic devices may be worn by a user. For example, electronic devices may be a watch, a head-mounted device (HMD), head-worn device (glasses), headphones, an ear mounted device, and so forth (e.g., electronic devices 410 and 460 are illustrated as HMDs). In some implementations, functions of the electronic devices described herein (e.g., devices 110, 410, 460, and 510) are accomplished via two or more devices, for example a mobile device and base station or a head mounted device and an ear mounted device. Various capabilities may be distributed amongst multiple device, including, but not limited to power capabilities, CPU capabilities, GPU capabilities, storage capabilities, memory capabilities, visual content display capabilities, audio content production capabilities, and the like. The multiple devices that may be used to accomplish the functions of the electronic devices described herein may communicate with one another via wired or wireless communications and/or via an intermediary device such as a viewing session server.

In some implementations, the electronic devices described herein (e.g., devices 110, 410, 460, and 510) include a position tracking instruction set to track a position of a content creator or viewer (e.g., user 102, 502, or his/her device 110, 510, respectively) relative to a 3D environment. This may involve tracking a position or movement of the viewer in a physical environment (e.g., physical environment 100), virtual environment, or XR environment. Position, including 2D or 3D coordinate information or orientation, may be tracked based on information from I/O device(s) and sensor(s) or image sensor system(s). In some implementations, the position tracking instruction set is executed to evaluate images of a physical environment, recognize objects in the physical environment, and determine a viewer position relative to the objects in the physical environment. In some implementations, the viewer position is additionally or alternatively tracked using an inertial measurement unit (IMU), an accelerometer, a magnetometer, or a gyroscope. In some implementations, a visual inertial odometry (VIO) technique or a simultaneous localization and mapping (SLAM) technique is applied to track viewer position. In some implementations, the position tracking instruction set implements a machine learning model that uses image data or sensor data to track viewer position.

Figure 7:
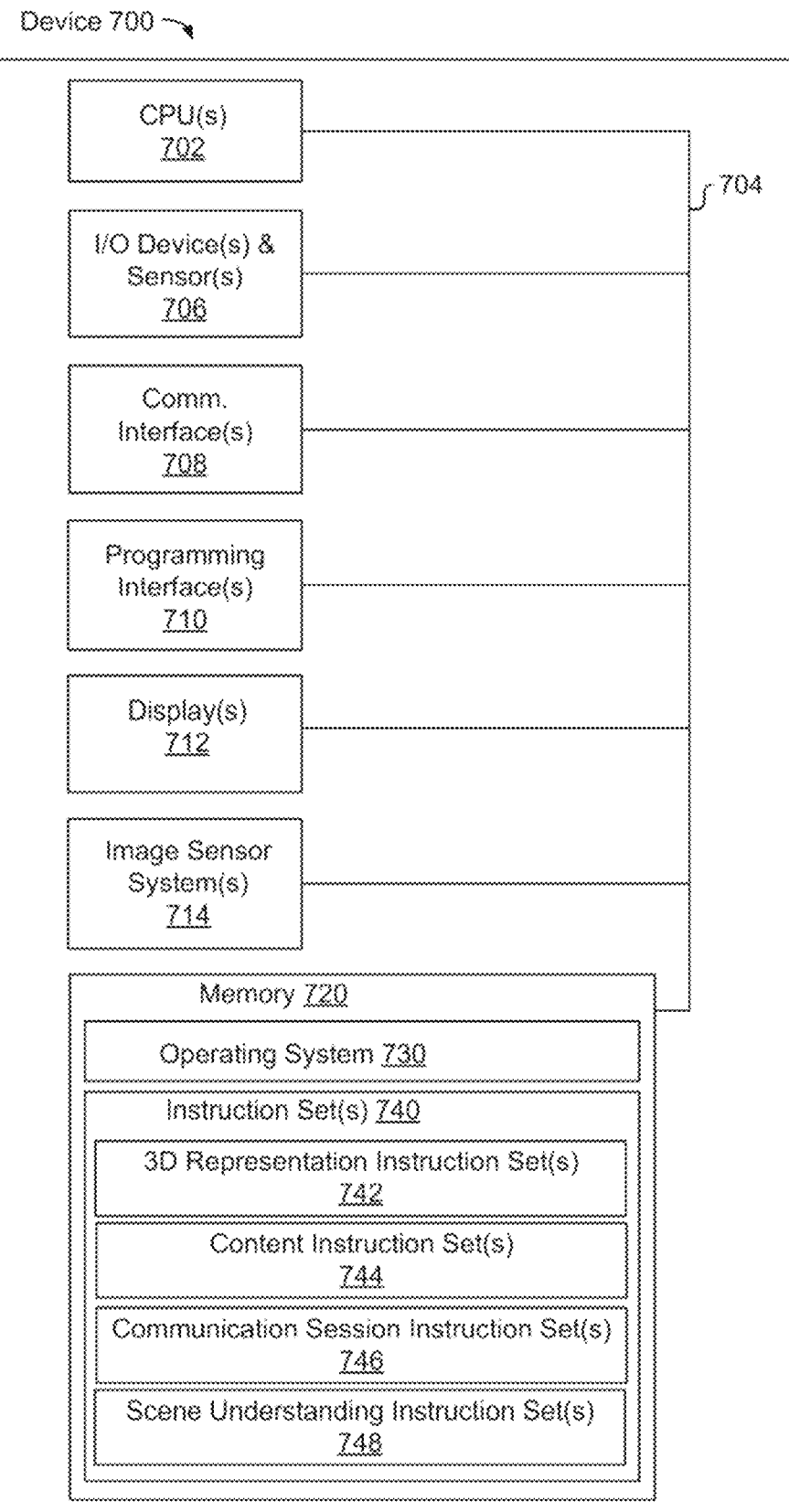
FIG. 7 illustrates device components of an exemplary device according to some implementations.

FIG. 7 is a block diagram of an example device 700. Device 700 illustrates an exemplary device configuration for an electronic device (e.g., device 110). While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 700 includes one or more processing units 702 (e.g., microprocessors, ASICs, FPGAs, GPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 710, one or more displays 712, one or more interior and/or exterior facing image sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 712 are configured to present a view of a physical environment or a graphical environment to the user. In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 712 correspond to diffractive, reflective, polarized, holographic, etc. waveguide displays. In one example, the device 700 includes a single display. In another example, the device 700 includes a display for each eye of the user (e.g., an HMD).

In some implementations, the one or more image sensor systems 714 are configured to obtain image data that corresponds to at least a portion of the physical environment 100. For example, the one or more image sensor systems 714 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 714 further include illumination sources that emit light, such as a flash. In various implementations, the one or more image sensor systems 714 further include an on-camera image signal processor (ISP) configured to execute a plurality of processing operations on the image data.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 includes a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of electrical charge. In some implementations, the instruction set(s) 740 are software that is executable by the one or more processing units 702 to carry out one or more of the techniques described herein.

The instruction set(s) 740 include a 3D representation instruction set 742, content instruction set 744, communication session instruction set 746, and a scene understanding instruction set 748. The instruction set(s) 740 may be embodied a single software executable or multiple software executables.

In some implementations, the 3D representation instruction set 742 is executable by the processing unit(s) 702 to generate 3D representation data (e.g., depth map, 3D point cloud, semantically labeled, etc.). For example, the 3D representation instruction set 742 obtains sensor data of a physical environment (e.g., physical environment 100 of FIG. 1) and generates 3D representation data (e.g., a 3D mesh representation, a 3D point cloud with associated semantic labels, or the like) using techniques described herein.

In some implementations, the content instruction set 744 is executable by the processing unit(s) 702 to provide and/or track content for display on a device. The content instruction set 744 may be configured to monitor and track the content over time (e.g., while viewing an XR environment), and generate and display virtual content. To these ends, in various implementations, the instruction includes instructions and/or logic therefor, and heuristics and metadata therefor.

In some implementations, the communication session instruction set 746 is executable by the processing unit(s) 702 to execute a communication session between two or more devices using one or more techniques. For example, a communication session may involve representations of either or both users that are positioned within any entirely virtual environment or an XR environment that includes some physical environment representations and some virtual environment representations. To these ends, in various implementations, the instruction includes instructions and/or logic therefor, and heuristics and metadata therefor.

In some implementations, the scene understanding instruction set 748 is executable by the processing unit(s) 702 to determine a context of the experience and/or the environment (e.g., create a scene understanding to determine the objects or people in the content or in the environment, where the user is, what the user is watching, etc.) using one or more of the techniques discussed herein (e.g., object detection, facial recognition, etc.) or as otherwise may be appropriate. To these ends, in various implementations, the instruction includes instructions and/or logic therefor, and heuristics and metadata therefor.

Although the instruction set(s) 740 are shown as residing on a single device, it should be understood that in other implementations, any combination of the elements may be located in separate computing devices. Moreover, FIG. 7 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 8:
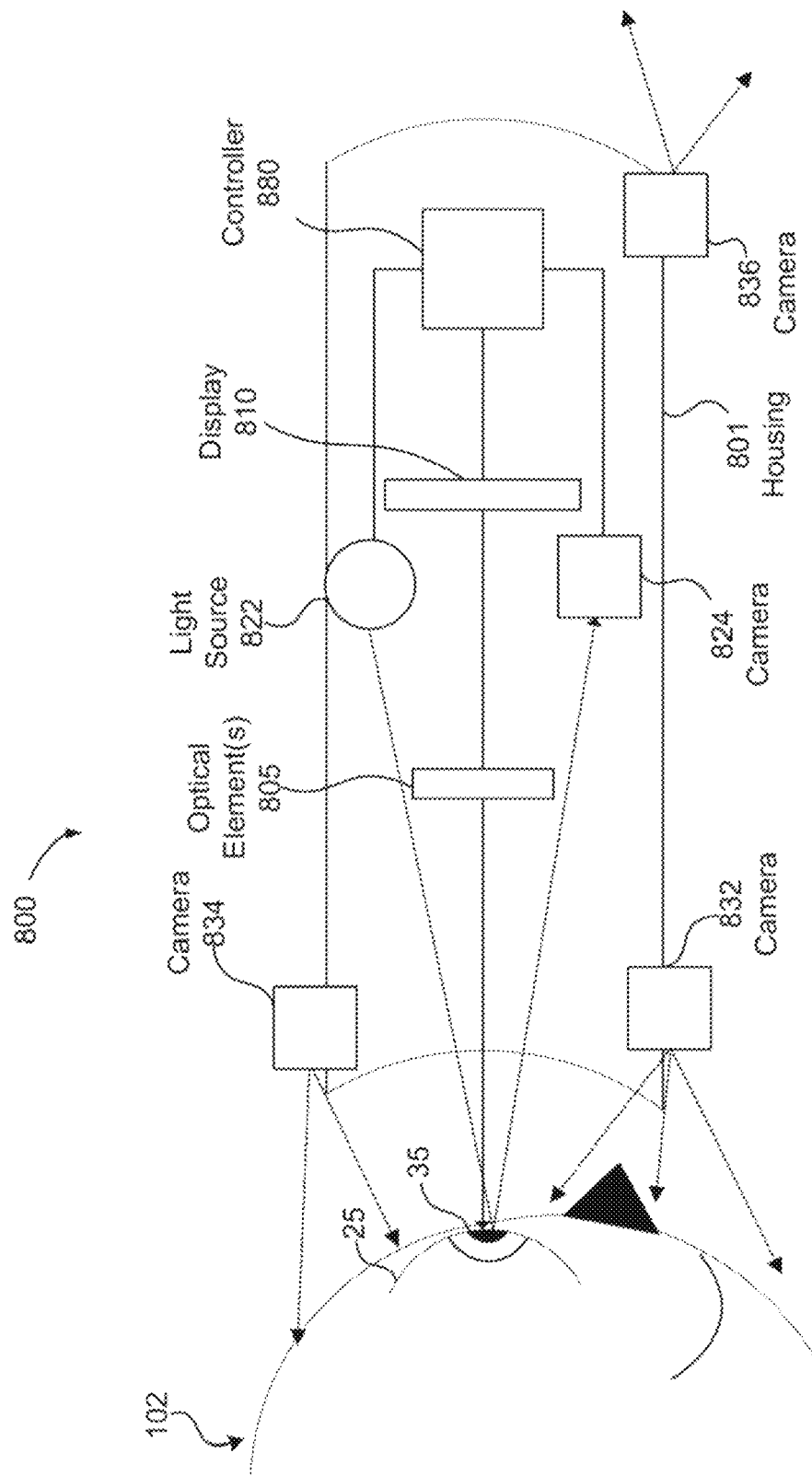
FIG. 8 illustrates an example of an HMD in accordance with some implementations.

FIG. 8 illustrates a block diagram of an exemplary head-mounted device 800 in accordance with some implementations. The head-mounted device 800 includes a housing 801 (or enclosure) that houses various components of the head-mounted device 800. The housing 801 includes (or is coupled to) an eye pad (not shown) disposed at a proximal (to the user 25) end of the housing 801. In various implementations, the eye pad is a plastic or rubber piece that comfortably and snugly keeps the head-mounted device 800 in the proper position on the face of the user 102 (e.g., surrounding the eye of the user 25).

The housing 801 houses a display 810 that displays an image, emitting light towards or onto the eye of a user 102. In various implementations, the display 810 emits the light through an eyepiece having one or more optical elements 805 that refracts the light emitted by the display 810, making the display appear to the user 102 to be at a virtual distance farther than the actual distance from the eye to the display 810. For example, optical element(s) 805 may include one or more lenses, a waveguide, other diffraction optical elements (DOE), and the like. For the user 102 to be able to focus on the display 810, in various implementations, the virtual distance is at least greater than a minimum focal distance of the eye (e.g., 7 cm). Further, in order to provide a better user experience, in various implementations, the virtual distance is greater than 1 meter.

The housing 801 also houses a tracking system including one or more light sources 822, camera 824, camera 832, camera 834, camera 836, and a controller 880. The one or more light sources 822 emit light onto the eye of the user 25 that reflects as a light pattern (e.g., a circle of glints) that can be detected by the camera 824. Based on the light pattern, the controller 880 can determine an eye tracking characteristic of the user 25. For example, the controller 880 can determine a gaze direction and/or a blinking state (eyes open or eyes closed) of the user 102. As another example, the controller 880 can determine a pupil center, a pupil size, or a point of regard. Thus, in various implementations, the light is emitted by the one or more light sources 822, reflects off the eye of the user 102, and is detected by the camera 824. In various implementations, the light from the eye of the user 102 is reflected off a hot mirror or passed through an eyepiece before reaching the camera 824.

The display 810 emits light in a first wavelength range and the one or more light sources 822 emit light in a second wavelength range. Similarly, the camera 824 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 102 selects an option on the display 810 by looking at it), provide foveated rendering (e.g., present a higher resolution in an area of the display 810 the user 102 is looking at and a lower resolution elsewhere on the display 810), or correct distortions (e.g., for images to be provided on the display 810).

In various implementations, the one or more light sources 822 emit light towards the eye of the user 102 which reflects in the form of a plurality of glints.

In various implementations, the camera 824 is a frame/shutter-based camera that, at a particular point in time or multiple points in time at a frame rate, generates an image of the eye of the user 102. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 824 is an event camera including a plurality of light sensors (e.g., a matrix of light sensors) at a plurality of respective locations that, in response to a particular light sensor detecting a change in intensity of light, generates an event message indicating a particular location of the particular light sensor.

In various implementations, the camera 832, camera 834, and camera 836 are frame/shutter-based cameras that, at a particular point in time or multiple points in time at a frame rate, can generate an image of the face of the user 102 or capture an external physical environment. For example, camera 832 captures images of the user's face below the eyes, camera 834 captures images of the user's face above the eyes, and camera 836 captures the external environment of the user (e.g., environment 100 of FIG. 1). The images captured by camera 832, camera 834, and camera 836 may include light intensity images (e.g., RGB) and/or depth image data (e.g., Time-of-Flight, infrared, etc.).

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a first device operated by a first user, the first device having a processor:
   presenting a view of an environment comprising one or more objects during a communication session involving a second device;
   determining, during the communication session, an objective of a second user of the second device corresponding to identifying a featured object in the environment based on determining a context indicative of a desired action, wherein determining the context indicative of the desired action comprises at least one of determining that the second device is broadcasting in a synchronous mode and determining that the second user is looking at or interacting with the featured object; and
   in accordance with the determined objective, providing a view of the environment with a visual effect.

2. The method of claim 1, wherein determining the context indicative of the desired action comprises determining that the second user is looking at or interacting with the featured object.

3. The method of claim 1, wherein determining the objective of the second user of the second device corresponding to identifying the featured object in the environment is based on physiological data obtained via one or more sensors, wherein the physiological data comprises:
   a direction of a gaze;
   a velocity of the gaze;
   positional information and velocity information for a left eye and a right eye;
   interpupillary distance (IPD) between a right eye and a left eye, and a diameter of the left eye and a diameter of the right eye;
   pupillary fixations;
   an image of an eye or electrooculography (EOG) data; or
   a pose and a movement of a hand or a head.

4. The method of claim 1, wherein, in accordance with identifying the featured object in the environment, providing the view of the environment by:
   removing a second object from the view of the environment;
   blurring a third object within the view of the environment;
   applying a translucent visual effect to a fourth object within the view of the environment;
   applying a white-out or grey-out visual effect to a fifth object within the view of the environment;
   applying a matte white visual effect to a sixth object within the view of the environment; or
   applying a frosted glass visual effect to a seventh object within the view of the environment.

5. The method of claim 1, wherein, in accordance with a determination that the identified featured object is within the view of the environment, the method further comprises:
   presenting a featured object element corresponding to the identified featured object within the view of the environment.

6. The method of claim 1, wherein, in accordance with determining that the identified featured object is excluded from the view of the environment, the method further comprises:
   presenting a notification element corresponding to the identified featured object within the view of the environment.

7. The method of claim 1, further comprising:
   obtaining depth-based data corresponding to the environment; and
   determining, based on the determined objective and the depth-based data, that a first object of the one or more objects in the environment is the featured object.

8. The method of claim 1, wherein the first device or the second device is a head-mounted device (HMD), and wherein the view of the environment comprises an extended reality (XR) experience.

9. A first device comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the one or more processors to perform operations comprising:
   presenting a view of an environment comprising one or more objects during a communication session involving a second device;
   determining, during the communication session, an objective of a second user of the second device corresponding to identifying a featured object in the environment based on determining a context indicative of a desired action, wherein determining the context indicative of the desired action comprises at least one of determining that the second device is broadcasting in a synchronous mode and determining that the second user is looking at or interacting with the featured object; and
   in accordance with the determined objective, providing a view of the environment with a visual effect.

10. The device of claim 9, wherein determining the context indicative of the desired action comprises determining that the second user is looking at or interacting with the featured object.

11. The device of claim 9, wherein determining the objective of the second user of the second device corresponding to identifying the featured object in the environment is based on physiological data obtained via one or more sensors, wherein the physiological data comprises:
   a direction of a gaze;
   a velocity of the gaze;
   positional information and velocity information for a left eye and a right eye;
   interpupillary distance (IPD) between a right eye and a left eye, and a diameter of the left eye and a diameter of the right eye;
   pupillary fixations;
   an image of an eye or electrooculography (EOG) data; or
   a pose and a movement of a hand or a head.

12. The device of claim 9, wherein, in accordance with identifying the featured object in the environment, providing the view of the environment by:
- removing a second object from the view of the environment;
- blurring a third object within the view of the environment;
- applying a translucent visual effect to a fourth object within the view of the environment;
- applying a white-out or grey-out visual effect to a fifth object within the view of the environment;
- applying a matte white visual effect to a sixth object within the view of the environment; or
- applying a frosted glass visual effect to a seventh object within the view of the environment.

13. The device of claim 9, wherein, in accordance with a determination that the identified featured object is within the view of the environment, the program instructions, when executed on the one or more processors, further cause the one or more processors to perform operations comprising:
- presenting a featured object element corresponding to the identified featured object within the view of the environment.

14. The device of claim 9, wherein, in accordance with determining that the identified featured object is excluded from the view of the environment, the program instructions, when executed on the one or more processors, further cause the one or more processors to perform operations comprising:
- presenting a notification element corresponding to the identified featured object within the view of the environment.

15. The device of claim 9, wherein the program instructions, when executed on the one or more processors, further cause the one or more processors to perform operations comprising:
- obtaining depth-based data corresponding to the environment; and
- determining, based on the determined objective and the depth-based data, that a first object of the one or more objects in the environment is the featured object.

16. The device of claim 9, wherein the first device or the second device is a head-mounted device (HMD), and wherein the view of the environment comprises an extended reality (XR) experience.

17. A non-transitory computer-readable storage medium, storing program instructions executable on a first device including one or more processors to perform operations comprising:
- presenting a view of an environment comprising one or more objects during a communication session involving a second device;
- determining, during the communication session, an objective of a second user of the second device corresponding to identifying a featured object in the environment based on determining a context indicative of a desired action, wherein determining the context indicative of the desired action comprises at least one of determining that the second device is broadcasting in a synchronous mode and determining that the second user is looking at or interacting with the featured object; and
- in accordance with the determined objective, providing a view of the environment with a visual effect.

18. The non-transitory computer-readable storage medium of claim 17, wherein determining the context indicative of the desired action comprises determining that the second user is looking at or interacting with the featured object.

19. The non-transitory computer-readable storage medium of claim 17, wherein determining the objective of the second user of the second device corresponding to identifying the featured object in the environment is based on physiological data obtained via one or more sensors, wherein the physiological data comprises:
- a direction of a gaze;
- a velocity of the gaze;
- positional information and velocity information for a left eye and a right eye;
- interpupillary distance (IPD) between a right eye and a left eye, and a diameter of the left eye and a diameter of the right eye;
- pupillary fixations;
- an image of an eye or electrooculography (EOG) data; or
- a pose and a movement of a hand or a head.

20. The non-transitory computer-readable storage medium of claim 17, wherein, in accordance with identifying the featured object in the environment, providing the view of the environment by:
- removing a second object from the view of the environment;
- blurring a third object within the view of the environment;
- applying a translucent visual effect to a fourth object within the view of the environment;
- applying a white-out or grey-out visual effect to a fifth object within the view of the environment;
- applying a matte white visual effect to a sixth object within the view of the environment; or
- applying a frosted glass visual effect to a seventh object within the view of the environment.

21. The non-transitory computer-readable storage medium of claim 17, wherein, in accordance with a determination that the identified featured object is within the view of the environment, the operations further comprise:
- presenting a featured object element corresponding to the identified featured object within the view of the environment.

22. The non-transitory computer-readable storage medium of claim 17, wherein, in accordance with determining that the identified featured object is excluded from the view of the environment, the operations further comprise:
- presenting a notification element corresponding to the identified featured object within the view of the environment.

23. The non-transitory computer-readable storage medium of claim 17, wherein the operations further comprise:
- obtaining depth-based data corresponding to the environment; and
- determining, based on the determined objective and the depth-based data, that a first object of the one or more objects in the environment is the featured object.

24. The non-transitory computer-readable storage medium of claim 17, wherein the first device or the second device is a head-mounted device (HMD), and wherein the view of the environment comprises an extended reality (XR) experience.

* * * * *